(12) United States Patent  
Ma

(10) Patent No.: US 8,144,588 B1
(45) Date of Patent: Mar. 27, 2012

(54) SCALABLE RESOURCE MANAGEMENT IN DISTRIBUTED ENVIRONMENT

(75) Inventor: Qingming Ma, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 542 days.

(21) Appl. No.: 11/853,116

(22) Filed: Sep. 11, 2007

(51) Int. Cl.
*H04L 1/00* (2006.01)
*H04L 12/26* (2006.01)
*H04L 12/28* (2006.01)
*H04L 12/56* (2006.01)
*H04L 12/54* (2006.01)

(52) U.S. Cl. ......... 370/235; 370/413; 370/428; 709/235
(58) Field of Classification Search .................. None
See application file for complete search history.

(56) References Cited

U.S. PATENT DOCUMENTS

| | | | | |
|---|---|---|---|---|
| 6,456,590 B1* | 9/2002 | Ren et al. | | 370/229 |
| 6,628,613 B1* | 9/2003 | Joung et al. | | 370/230 |
| 6,721,273 B1* | 4/2004 | Lyon | | 370/235 |
| 7,190,669 B2* | 3/2007 | Banerjee | | 370/229 |
| 7,209,445 B2* | 4/2007 | Miller et al. | | 370/235 |
| 7,286,552 B1* | 10/2007 | Gupta et al. | | 370/413 |
| 7,408,876 B1* | 8/2008 | Gupta et al. | | 370/230 |
| 7,554,908 B2* | 6/2009 | Jain et al. | | 370/230 |
| 7,599,292 B1* | 10/2009 | Gupta et al. | | 370/235 |
| 2002/0150049 A1* | 10/2002 | Collier et al. | | 370/236 |
| 2003/0002509 A1* | 1/2003 | Vandenhoudt et al. | | 370/395.72 |
| 2003/0126280 A1* | 7/2003 | Yao et al. | | 709/234 |
| 2004/0257991 A1* | 12/2004 | Sterne et al. | | 370/230 |
| 2005/0013251 A1* | 1/2005 | Wang et al. | | 370/235 |
| 2006/0092837 A1* | 5/2006 | Kwan et al. | | 370/229 |
| 2007/0047535 A1* | 3/2007 | Varma | | 370/360 |
| 2007/0153697 A1* | 7/2007 | Kwan et al. | | 370/235 |
| 2009/0003212 A1* | 1/2009 | Kwan et al. | | 370/235 |

* cited by examiner

*Primary Examiner* — Chirag Shah
*Assistant Examiner* — Suk Jin Kang
(74) *Attorney, Agent, or Firm* — Harrity & Harrity, LLP

(57) ABSTRACT

A method may include receiving a packet in a network device, selecting one of a group of ingress buffers, where each ingress buffer is associated with a different one of a group of processors, distributing the packet to the selected ingress buffer; and scheduling the packet, based on a congestion state of a queue in an egress buffer associated with the packet, to be processed by the processor associated with the selected ingress buffer to provide a network service.

20 Claims, 7 Drawing Sheets

SCALABLE RESOURCE MANAGEMENT IN DISTRIBUTED ENVIRONMENT

BACKGROUND

The demand for network devices to provide network services is growing. Such network services may include data compression and caching (including molecular sequence reduction and network sequence caching), acceleration (including packet flow acceleration and application flow acceleration), application control (including quality of service (QoS) and policy-based multipath), and deterministic finite automaton (DFA) pattern matching.

SUMMARY

According to one aspect, a method may include receiving a packet in a network device; selecting one of a group of ingress buffers, where each ingress buffer is associated with a different one of a group of processors; distributing the packet to the selected ingress buffer; and scheduling the packet, based on a congestion state of a queue in an egress buffer associated with the packet, to be processed by the processor associated with the selected ingress buffer to provide a network service.

According to another aspect, a network device may include a receiver to receive a packet; a group of memories, each memories storing a different ingress buffer and at least one of memories storing an egress buffer including a queue associated with the packet; and a group of processors, each associated with a different ingress buffer, where one of the processors selects one of a plurality of ingress buffers and distributes the packet to the selected ingress buffer; where the processor associated with the selected ingress buffer schedules the packet, based on a congestion state of the queue associated with the packet, to be processed by the processor associated with the selected ingress buffer to provide a network service.

According to another aspect, an apparatus may include means for receiving a packet in a network device; means for selecting one of a plurality of ingress buffers, where each ingress buffer is associated with a different one of a plurality of processors; means for distributing the packet to the selected ingress buffer; and means for scheduling the packet, based on a congestion state of a queue in an egress buffer associated with the packet, to be processed by the processor associated with the selected ingress buffer to provide a network service.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

As the demand for network services increases, network devices that provide these services may be limited by processing power, among other things. In embodiments disclosed herein, a network device may receive a packet and may select one of a group of ingress buffers for distributing the packet. Each ingress buffer may be associated with a different one of a group of processors. The network device may then distribute the packet to the selected ingress buffer and schedule the packet for processing in the associated processor based on the congestion state of a queue in an egress buffer for the network device, for example. As such, the network device may properly allocate processor resources and egress buffer resources.

Exemplary Environment

Figure 1:
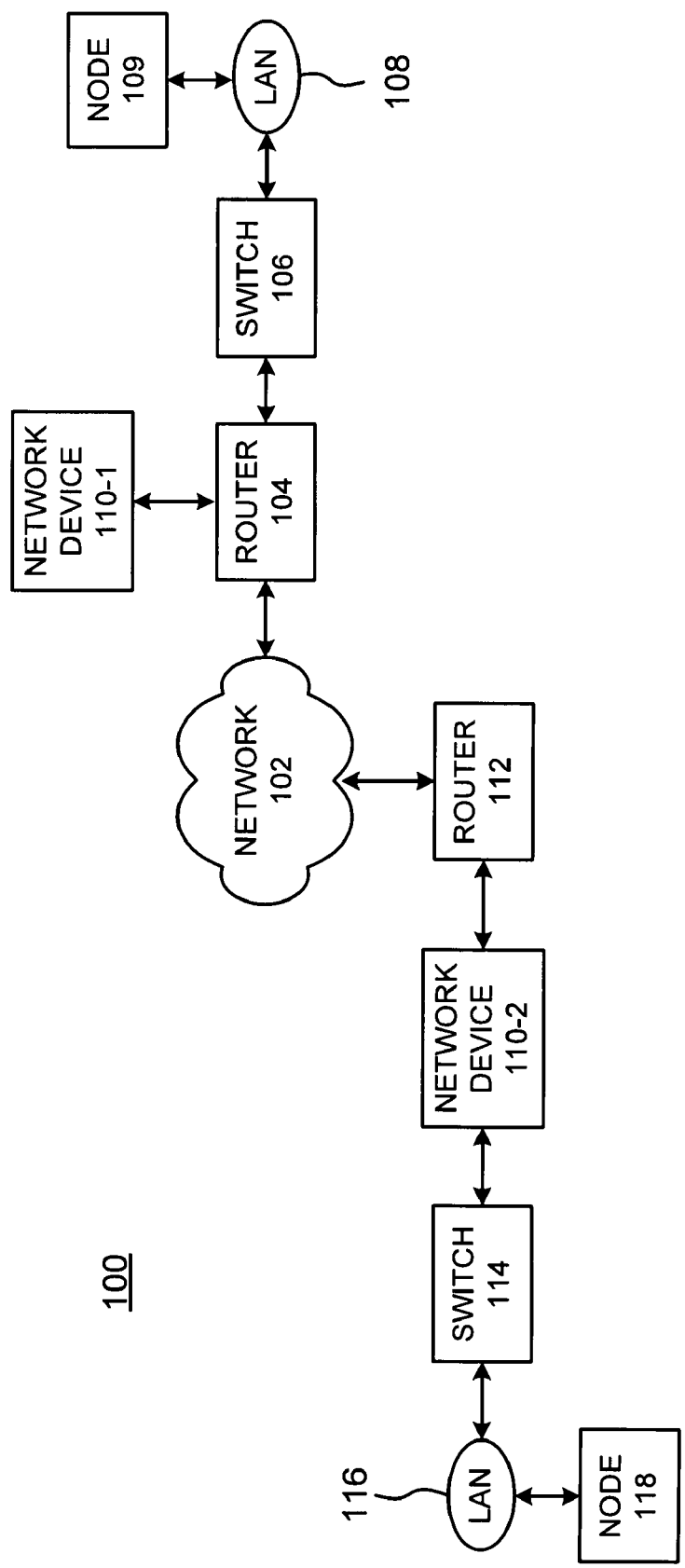
FIG. 1 is a block diagram of an exemplary environment in which embodiments described herein may be implemented.

FIG. 1 is a block diagram of an exemplary environment 100 in which embodiments described herein may be implemented. Environment 100 may include a network 102, a router 104, a switch 106, a local area network (LAN) 108, a node 109, network devices 110-1 and 110-2, a router 112, a switch 114, a LAN 116, and a node 118. In practice, there may be more, different, or fewer devices or a different arrangement of devices than what is shown in FIG. 1. For example, environment 100 may include thousands or even millions of nodes and/or network devices. Further, while FIG. 1 shows devices in environment 100, one or more of these devices may be remotely located from each other, e.g., the devices may be geographically diverse. Although arrows in FIG. 1 may indicate communication directly between devices, communication may be indirect through one or more networks.

Communication among network 102, router 104, switch 106, local area network (LAN) 108, node 109, network devices 110-1 and 110-2, router 112, switch 114, LAN 116, and node 118 may be accomplished via wired and/or wireless communication connections. Node 109 (coupled to LAN 108) may communicate with node 118 (coupled to LAN 116) and vice versa. Communication between nodes 109 and 118 may take place through LAN 108, switch 106, network device 110-1, router 104, network 102, router 112, network device 110-2, switch 114, and LAN 116. For example, node 109 may establish a session with node 118. Sessions may include telephone calls, multimedia distribution, or multimedia conferences. A session may include a lasting connection between two nodes and may include one or more flows of packets between nodes. For example, a telephone call between nodes 109 and 118 may include a real-time flow of packets from node 109 to node 118 and a real-time flow of packets from node 118 to node 109.

Network 102 may include a wide-area network (WAN), e.g., the Internet, a local-area network (either wired or wireless), a telephone network, e.g., the Public Switched Telephone Network (PSTN), an intranet, a private corporate network, or a combination of networks.

Routers 104 and 112 and switches 106 and 114 may inspect packets, determine the proper path for the packets, and forward the packets to other devices next in line along the determined paths. LANs 109 and 118 may include a group of computers or other devices, including nodes 109 and 118, respectively, that may communicate among each other.

Nodes 109 and 118 may include computers, telephones, personal digital assistants, or any other communication devices that may transmit or receive data. Nodes 109 and 118 may include, for example, computers that exchange data Network devices 110-1 and 110-2 may provide network services to nodes in environment 100. Such services may include compression and caching (including molecular sequence reduction and network sequence caching), acceleration (including packet flow acceleration and application flow acceleration), application control (including quality of service (QoS) and policy-based multipath), and DFA pattern matching. Network devices 110-1 and 110-2 may receive packets, perform network services, and then forward packets. Network devices 110-1 and 110-2 may also include and perform the functions of a router, a switch, a packet forwarding engine, a firewall, or any other network device capable of receiving and forwarding packets. Network devices 110-1 and 110-2 may include, for example, Juniper's WX System™ and Juniper's IDP™ system.

Network Device

Figure 2:
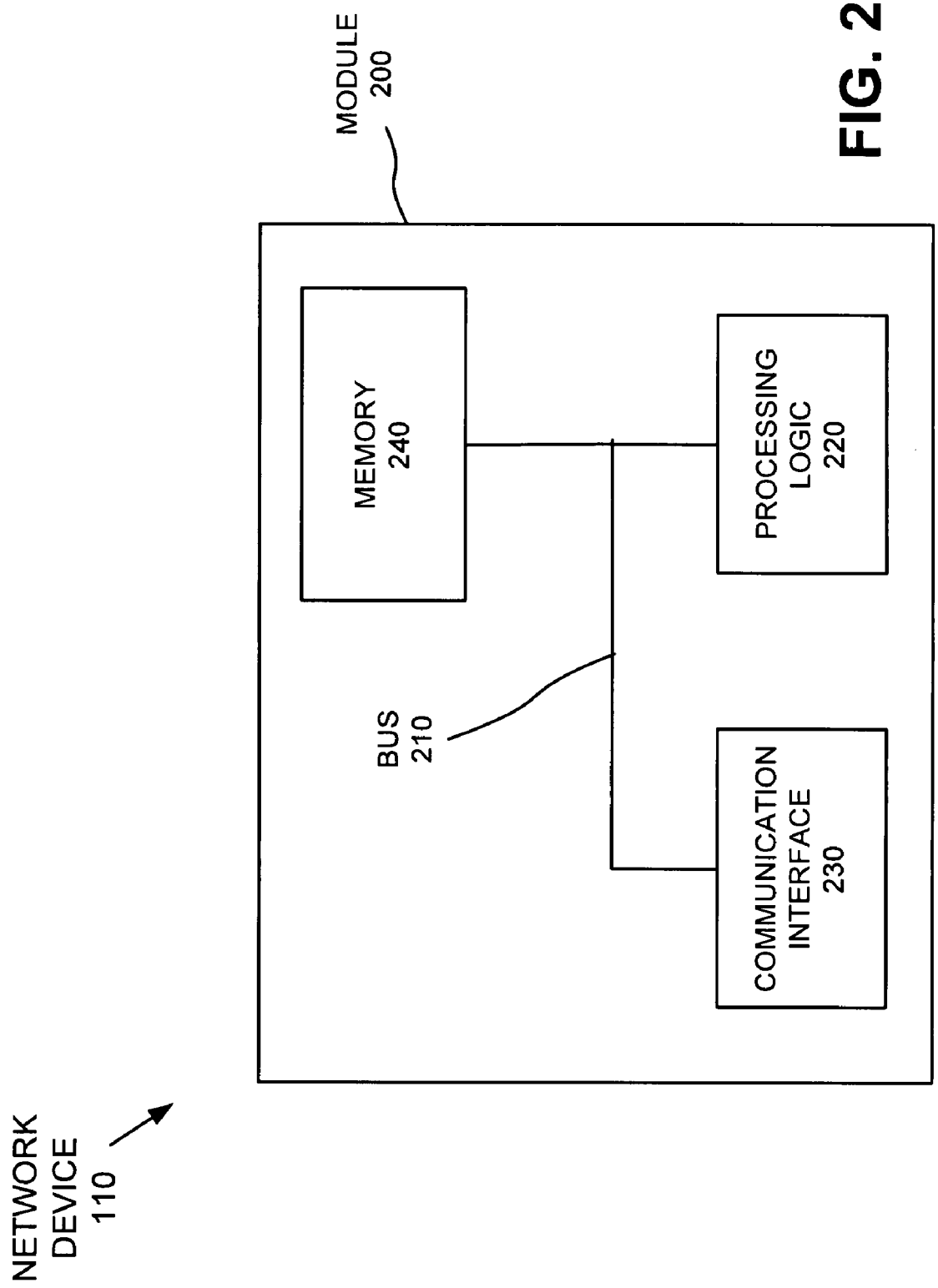
FIG. 2 is a block diagram of exemplary components of the network device of FIG. 1.

FIG. 2 is a block diagram of exemplary components of network devices 110-1 and 110-2 (each network device may be referred to as "network device 110"). As shown in FIG. 2, network device 110 may include a module 200. In one embodiment, network device 110 may include a "rack" that may include one or more modules, e.g., a cluster of modules. Module 200 may include a bus 210, processing logic 220, a communication interface 230, and a memory 240. Module 200 may include other components (not shown) that aid in receiving, transmitting, and/or processing data. Moreover, other configurations of components in module 200 are possible. In addition, network device 110 may include other components (not shown) or configuration of components.

Bus 210 may include a path that permits communication among the components of module 200. Processing logic 220 may include any type of processor or microprocessor that interprets and executes instructions. In other embodiments, processing logic 220 may include an application specific integrated circuit (ASIC), field programmable gate array (FPGA), or the like.

Communication interface 230 may include any transceiver-like mechanism (e.g., a receiver/transmitter combination) that enables module 200 to communicate with other devices and/or systems. Communication interface 230 may allow for wired or wireless communications. In one implementation, communication interface 230 may allow for module 200 to be controlled and/or administered remotely by an operator or an administrator.

Memory 240 may include a random access memory (RAM) or another type of dynamic storage device that may store information and instructions for execution by processing logic 220; a read only memory (ROM) device or another type of static storage device that may store static information and instructions for use by processing logic 220; and/or some other type of magnetic or optical recording medium and its corresponding drive for storing information and/or instructions. Memory 240 may store network service applications. Network service applications may include instructions for causing module 200 to implement network services, such as compression and caching (including molecular sequence reduction and network sequence caching), acceleration (including packet flow acceleration and application flow acceleration), application control (including quality of service (QoS) and policy-based multipath), and DFA pattern matching.

Module 200 may perform certain operations, as described in detail below. Module 200 may perform these operations in response to processing logic 220 executing software instructions contained in a computer-readable medium, such as memory 240. A computer-readable medium may be defined as a physical or logical memory device and/or carrier wave. The software instructions may be read into memory 240 from another computer-readable medium or from another device via communication interface 230. The software instructions contained in memory 240 may cause processing logic 220 to perform processes that are described below.

Figure 3:
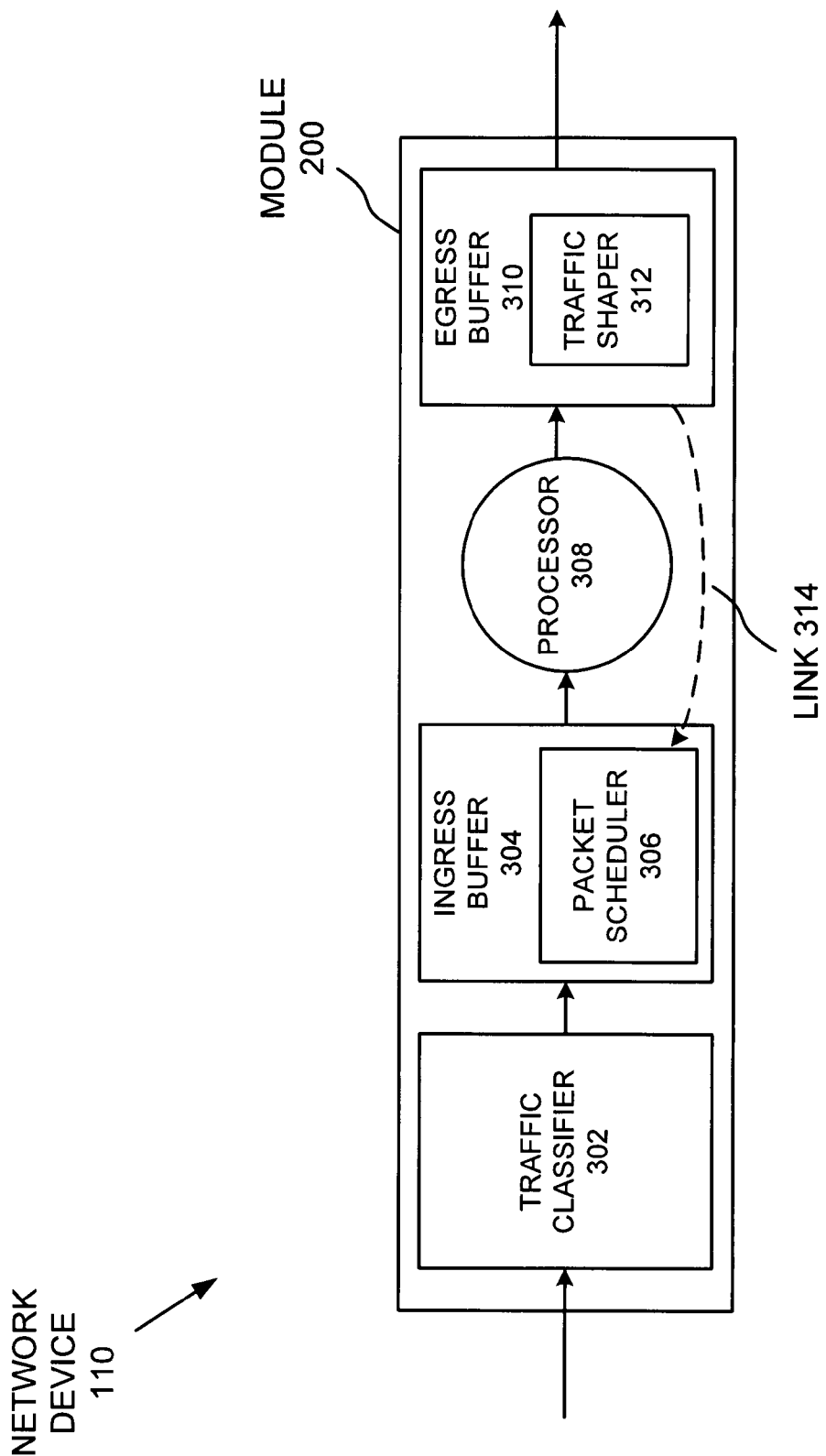
FIG. 3 is a block diagram of exemplary functional elements of the network device of FIG. 1.

FIG. 3 is a block diagram of exemplary functional elements of network device 110. As with FIG. 2, network device 110 in FIG. 3 may include a module 200. In one embodiment, network device 110 may include a rack that may include one or more modules. Module 200 may include a traffic classifier 302, an ingress buffer 304, a packet scheduler 306, a processor 308, an egress buffer 310, and a traffic shaper 312. In practice, there may be more, different, or fewer components or a different arrangement of components than what is shown in FIG. 3. Further, although FIG. 3 shows components within module 200, components may be remotely located from each other, e.g., the components may be geographically diverse. Although arrows in FIG. 3 may indicate communication directly between components, communication may be indirect through one or more networks.

Traffic classifier 302 may inspect packets as they arrive and may classify the packets. In one embodiment, traffic classifier 302 may inspect the source address, destination address, source port, destination port, and/or protocol of a packet to determine whether the packet belongs to a class, flow, and/or session. Traffic classifier 302 may also inspect deeper into a packet (e.g., layer 7 inspection) to determine a class, flow, and/or a session. For example, node 109 may establish a session with node 118 and the session may include two real-time flows of packets (e.g., voice communications) in each direction between nodes 109 and 118. If a packet is determined not to be a part of a previously-identified flow, traffic classifier 302 may determine that the packet is part of a newly-identified flow. If it is determined that a packet is part of a previously-identified flow, traffic classifier 302 may determine that the packet is part of this previously-identified flow.

Ingress buffer 304 may store packets until packet scheduler 306 schedules them for release to processor 308. Ingress buffer 304 may include many individual queues, and an individual queue may be identified by a queue ID. Queuing in ingress buffer 304 may be hierarchical with multiple levels. At one level in one embodiment, there may be a queue for each logical interface. At another level in one embodiment, each class of traffic may have queue. At yet another level in one embodiment, each flow of traffic may have a queue. For example, ingress buffer 304 may include a queue for each class of traffic provided by traffic classifier 302. In one embodiment, ingress buffer 304 may also perform policing, rate limiting, and marking.

Packet scheduler 306 may determine when packets are released from ingress buffer 304 to processor 308. In one embodiment, packet scheduler 306 may throttle, e.g., delay, the release of a packet if the egress queue that buffers the post-processed packet is congested. For example, packet scheduler 306 may throttle the release of packets belonging to a class of traffic, for example, if a queue (or queues) storing packets corresponding to that class is congested in egress buffer 310. Packet scheduler 306 may receive congestion information from egress buffer 310 through a communication line 314 (shown as a dashed line in FIG. 3). Packet scheduler 306 may use different policies to schedule packets, such as a priority-based policy or a weighted-sharing based policy. In one embodiment, the policy to schedule packets may be selected by a user, e.g., a customer or service provider. Packet scheduler 306 may assist in properly allocating the resources of processor 308 and egress buffer 310.

Each traffic class may be treated differently to differentiate services. For example, each traffic class may be subject to a different rate limit, shaped separately and/or prioritized relative to other traffic classes. Upon classifying a traffic flow using a particular protocol, a different policy may be applied to different classes of traffic to guarantee a quality of service (QoS). For example, VoIP traffic or media streaming traffic may require a minimum QoS and email traffic may require best-effort delivery. Traffic classifier may identify sessions, flows, etc., by using a class ID. Upon classification, traffic classifier 302 may pass packets to ingress buffer 304, along with the class ID of the packets.

Processor 308 may provide network service applications to nodes in environment 100. Services may include compression and caching (including molecular sequence reduction and network sequence caching), acceleration (including packet flow acceleration and application flow acceleration), application control (including quality of service (QoS) and policy-based multipath), and DFA pattern matching. Other types of network services are possible. For example, other services may include services associated with switches, routers, bridges, and/or hubs. Processor 308 may pass post-processed packets to egress buffer 310. A processed packet may include compressed data and, therefore, may include information that was in multiple pre-processed packets. As a result, in one embodiment, processor 308 may pass post-processed packets to egress buffer 310 without delay to minimize latency.

Egress buffer 310 may store packets until traffic shaper 312 releases them for transmission out of network device 110 toward their destination. Egress buffer 310 may include a group of queues. The queues in egress buffer 310 may be structured similarly to the queues in ingress buffer 304. Queuing in egress buffer 302 may be hierarchical with multiple levels. At one level in one embodiment, there may be a queue for each logical interface. At another level in one embodiment, each class of traffic may have queue. At yet another level in one embodiment, each flow of traffic may have a queue. In one embodiment, there is a queue in egress buffer 310 corresponding to each queue in ingress buffer 304. Traffic shaper 312 and egress buffer 310 may perform traffic shaping, e.g., they may attempt to control traffic in order to optimize or guarantee performance, low latency, and/or bandwidth by delaying and/or scheduling packets.

Figure 4:
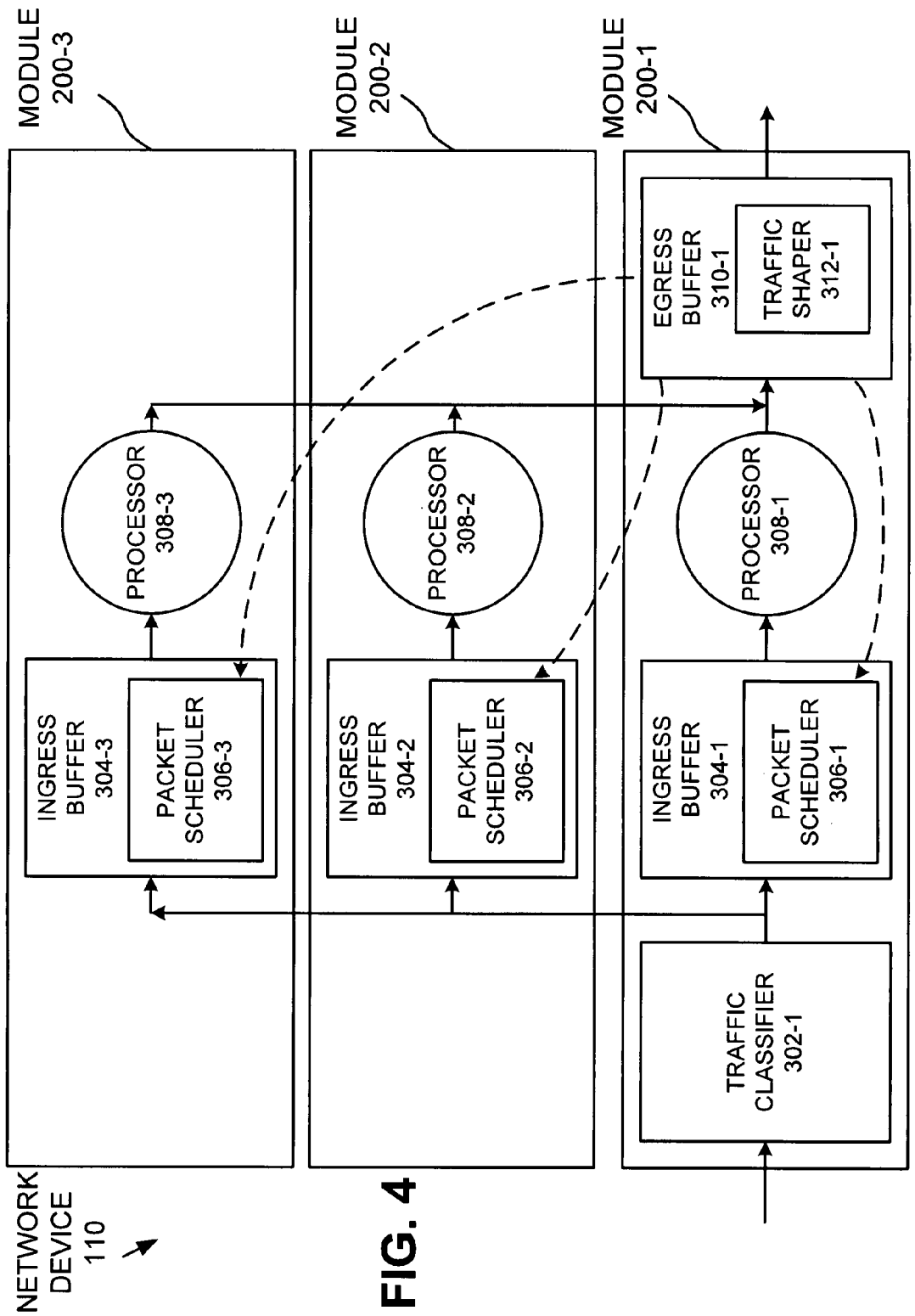
FIG. 4 is a block diagram of exemplary functional elements of the network device of FIG. 1 including a group of modules.

FIG. 4 is a block diagram of exemplary functional elements of network device 110. As shown in FIG. 4, network device 110 may include a group of modules, including modules 200-1 through module 200-3 (individually "modules 200-x"). In one embodiment, module 200-1 may be considered a "master" module and modules 200-2 and 200-3 may be considered "slave" modules.

Modules 200-1 through 200-3 may be configured similarly to module 200 in FIG. 2 and FIG. 3. Module 200-1 may include a traffic classifier 302-1, an ingress buffer 304-1, a packet scheduler 306-1, a processor 308-1, an egress buffer 310-1, and a traffic shaper 312-1. Module 200-2 may include an ingress buffer 304-2, a packet scheduler 306-2, and a processor 308-2. Module 200-3 may include an ingress buffer 304-3, a packet scheduler 306-3, and a processor 308-3. In some implementations, modules 200-2 and 200-3 may also include traffic classifiers and/or egress buffers, but these functional elements are not shown in FIG. 4 for simplicity.

In practice, there may be more, different, or fewer modules or a different arrangement of modules than what is shown in FIG. 4. Further, modules 200-1 through 200-3 may be remotely located from each other, e.g., the modules 200-1 through 200-3 may be geographically diverse. Although arrows in FIG. 4 may indicate communication directly between modules, communication may be indirect through one or more networks.

A packet may enter module 200-1 and may enter traffic classifier 302-1. Traffic classifier 302 may forward the packet to ingress buffers 304-1, 304-2, or 304-3. As such, traffic classifier 302-1 may perform the functions of a load balancer, distributing received packets among modules 200-1, 200-2, and 200-3. Traffic classifier 302-1 may balance the load based on determined flows, classes, or sessions, for example.

Ingress buffers 304-1, 304-2, and 304-3 may have hierarchical ingress queues similar to the ingress queues described with respect to ingress buffer 304 above. Packet scheduler 306-1 may release packets to processor 308-1 based on the congestion status of the corresponding queue in egress buffer 310-1. For example, if egress buffer 310-1 is congested for a particular queue, then the corresponding queue in ingress buffer 304-1 may, in one embodiment, not release a packet to processor 308-1. Likewise, packet scheduler 306-2 may release packets to processor 308-2 based on the congestion status of the corresponding queue in egress buffer 310-1. Further, packet scheduler 306-3 may release packets to processor 308-3 based on the congestion status of the corresponding queue in egress buffer 310-1. Packet schedulers 306-1, 306-2, and 306-3 may receive congestion state information from egress buffer via a communication channel (shown with dashed lines in FIG. 4).

Processors 308-1 through 308-3 may perform network services described above with respect to processor 308 and FIG. 3.

Egress buffer 310-1 may store packets until traffic shaper 312-1 may release them for transmission out of network device 110 toward their destination. Traffic shaper 312-1 and egress buffer 310-1 may perform traffic shaping, e.g., they may attempt to control traffic in order to optimize or guarantee performance, low latency, and/or bandwidth by delaying packets. In this embodiment, traffic is shaped by egress buffer 310-1 and traffic shaper 312-1 only.

In another embodiment, egress buffer 310-2 (not shown) and egress buffer 310-3 (not shown) may be used for traffic shaping. In this embodiment modules 200-2 and 200-3 may maintain their own egress buffers and traffic shaping may either not be uniformly performed by the modules 200-1 through 200-3 or modules 200-1 through 200-3 may communicate with each other for uniform traffic shaping.

Exemplary Processes

Figure 5:
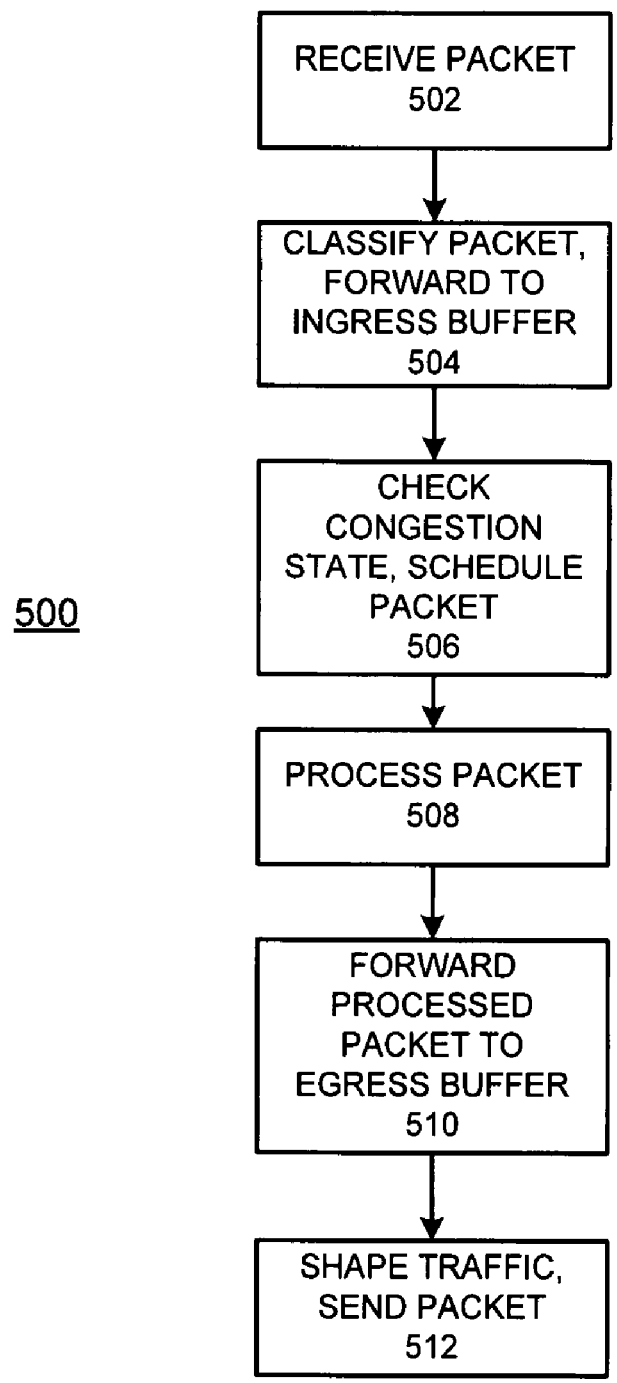
FIG. 5 is a flowchart of an exemplary process for providing a network service in the network device of FIG. 1.

FIG. 5 is a flowchart of an exemplary process 500 for providing a network service. Process 500 may run in network device 110. Process 500 is described below with respect to network device 110 in FIG. 4 including modules 200-1 through 200-3.

Process 500 may begin when network device 110 receives a packet (block 502). The packet may be classified and forwarded to the appropriate module (block 504). Packets may be classified and forwarded by traffic classifier 302-1, for example. In one embodiment, packets in the same class, flow, and/or session may be forwarded to the same module and may be placed in the same queue. In another embodiment, packets may be forwarded to modules 200-1 through 200-3 in a round-robin fashion on a per-flow basis.

The congestion state may be checked and the packet may be scheduled (block 506). For example, if the packet is distributed to module 200-1, then packet scheduler 306-1 may check the congestion state and schedule the packet. If the packet is distributed to module 200-2, then packet scheduler 306-2 may check the congestion state and schedule the packet. If the packet is distributed to module 200-3, then packet scheduler 306-3 may check the congestion state and schedule the packet. The packet may be scheduled based on congestion information received from egress buffer 310. For example, if the egress queue corresponding to the ingress queue storing the packet is congested, then the ingress queue may not schedule the packet to be sent to the processor. Scheduling a packet (block 506) may allow for a proper allocation of system resources, such as the resources of processor 308 and egress buffer 310. Scheduling a packet (block 506) may also allow for different scheduling policies to apply to different flows, classes and/or sessions. Packet scheduler 306-1, 306-2, or 306-3 may use policies to schedule packets, such as a priority-based policy or a weighted-sharing based policy. For example, a packet in a flow of packets in a telephone conversation (requiring a minimum QoS) may be scheduled before a packet associated with an e-mail (requiring a best effort).

When the packet is sent to the processor (e.g., processor 306-1, 306-2, or 306-3), the packet may be processed (block 508). The post-processed packet may be sent to egress buffer 310-1 (block 510) for traffic shaping. Traffic shaper 312-1 may schedule and sending the packet out of network device 110 (block 512).

Figure 6:
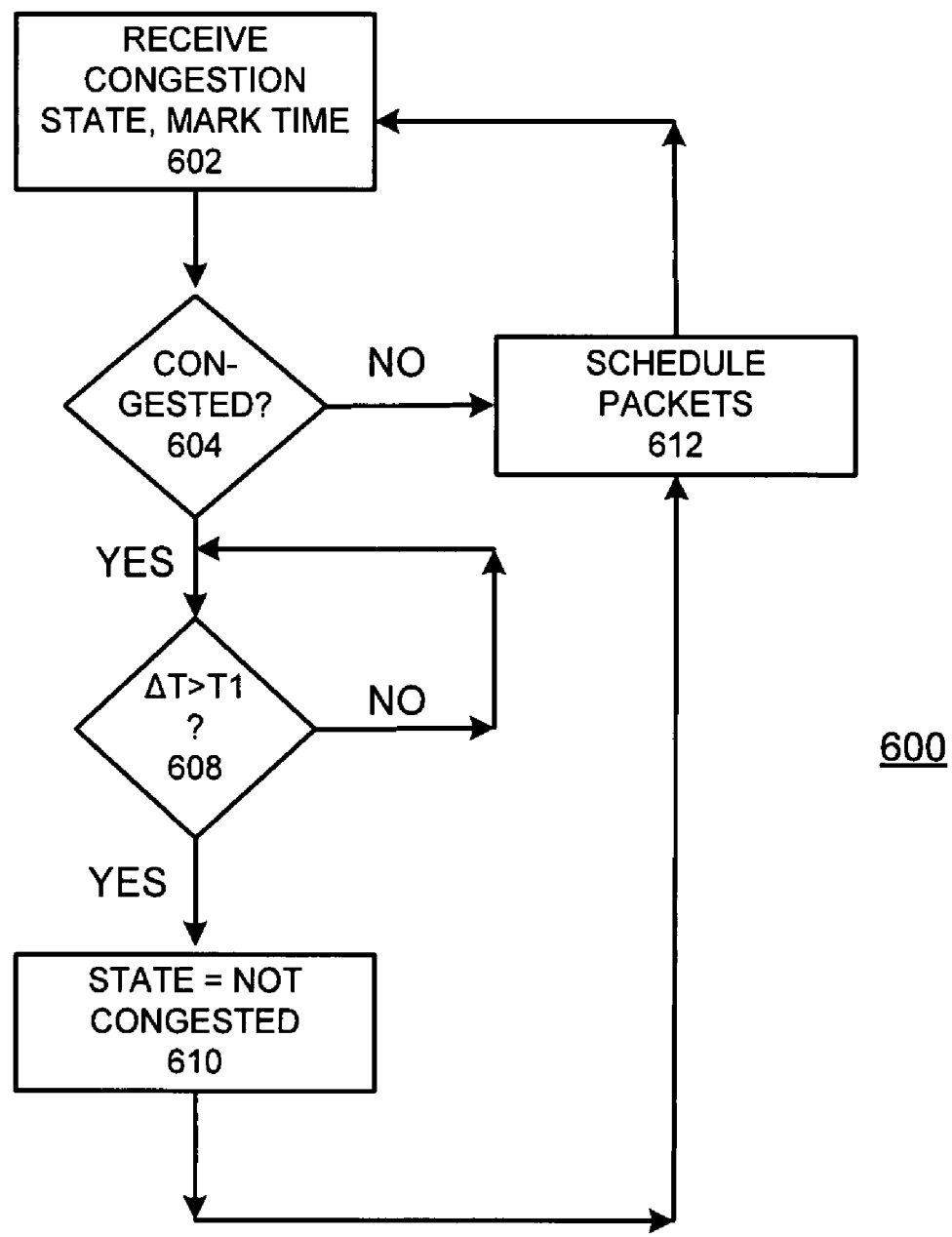
FIG. 6 is a flowchart of an exemplary process for scheduling traffic in the network device of FIG. 1.

FIG. 6 is a flowchart of an exemplary process 600 for scheduling traffic. Process 600 is described below with respect to network device 110 as shown in FIG. 4 including modules 200-1, 200-2, and 200-3. Process 600 may run in network device 110 and may schedule packets being released from an ingress queue, such as an ingress queue in ingress buffers 304-1, 304-2, and 304-3. Portions of or all of process 600 may run in modules 200-1, 200-2, and/or 200-3. In one embodiment, process 600 may run in packet scheduler 306-1. Process 600 is described with respect to ingress buffer 304-2, packet scheduler 306-2, and processor 308-2 in module 200-2. Process 600 may equally apply to the components and/or functional elements of modules 200-1 and 200-3.

The congestion state of a queue in egress buffer 310-1 may be received and the time the congestion state was received may be marked (block 602). If the state is NOT CONGESTED (block 604: NO), then packet scheduler 306-2 may schedule packets (block 612) in the corresponding ingress queue in ingress buffer 304-2 for release to processor 308-2. If the state is CONGESTED (block 604: YES), then packet scheduler 306-2 may not schedule packets in the corresponding ingress queue in ingress buffer 304-2 for release to processor 308-2. Releasing a packet to processor 308-2 when its egress queue is CONGESTED may be a waste of the resources of processor 308-2 because processor 308-2 may release the processed packet to egress buffer 310-1 where the processed packet must wait.

If the state is CONGESTED (block 604: YES), but the current time minus the marked time when the congested state was received ($\Delta T$) is greater than a threshold (T1), then the state stored for the egress queue in egress buffer 310-1 may be reset to NOT CONGESTED (block 610). If the current time minus the time the congested state was received ($\Delta T$) is not greater than a threshold T1, then process 600 may wait until sufficient time has passed such that the threshold T1 has been reached (e.g., process 600 may loop back to block 608) before the state may be reset to NOT CONGESTED (block 610). However, if a congestion state is received from the egress queue in egress buffer 310-1, process 600 may be interrupted and may start again at block 602. Resetting the state to NOT CONGESTED (block 610) may allow for the scheduling of packets (block 612) in the event that a NOT CONGESTED state message is lost between egress buffer 310-1 and packet scheduler 306-2. Threshold T1 may be on the order of a millisecond, a centisecond, a second, etc.

Figure 7:
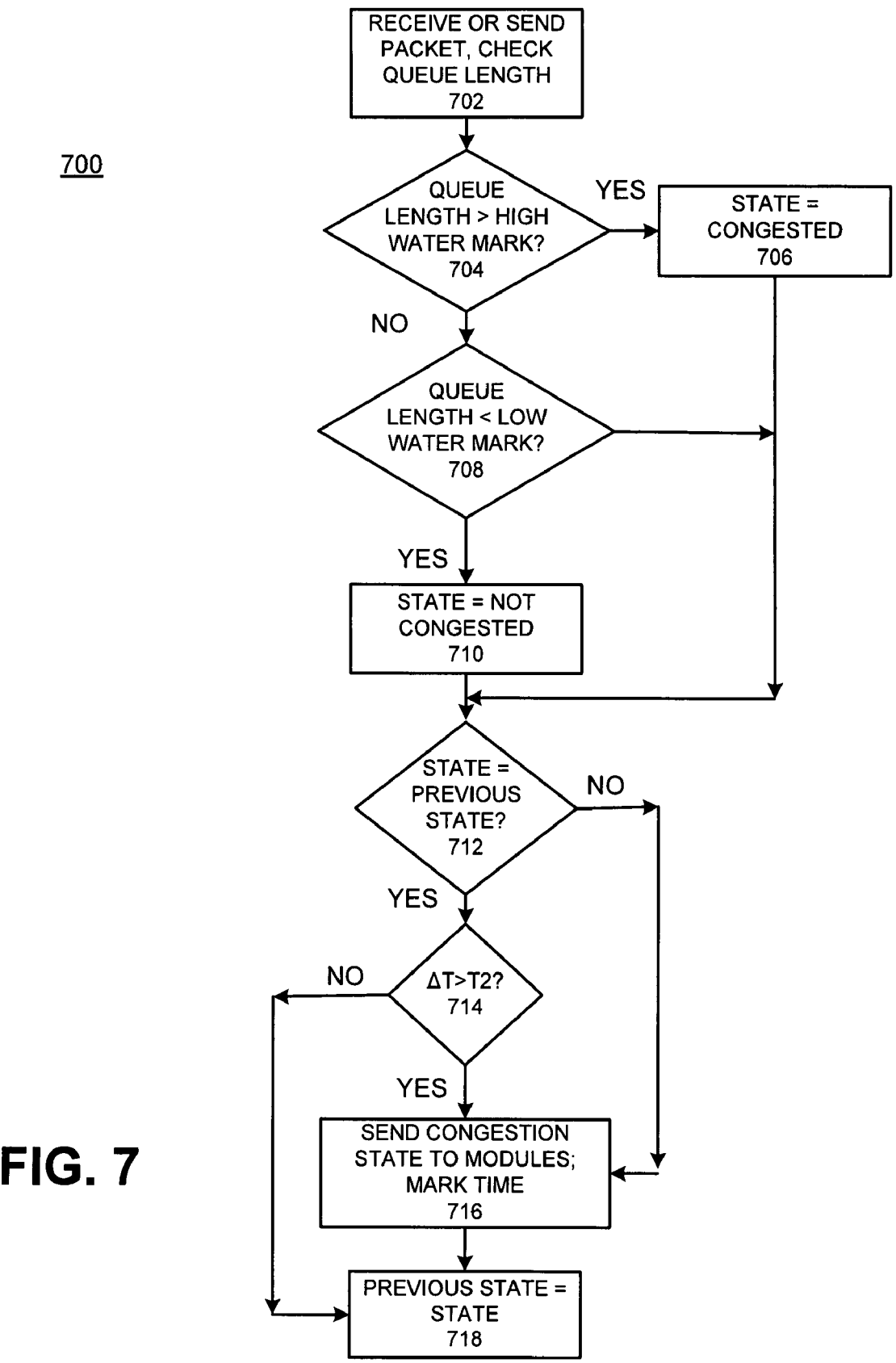
FIG. 7 is a flowchart of an exemplary process for signaling congestion in the network device of FIG. 1.

FIG. 7 is a flowchart of an exemplary process 700 for signaling congestion in network device 110. Process 700 is described with respect to network device 110 shown in FIG. 4 including modules 200-1, 200-2, and 200-3. In particular, process 700 is described with respect to ingress buffer 304-2, packet scheduler 306-2, and processor 308-2 in module 200-2. Process 700 may equally apply to the components and the functional elements of modules 200-1 and 200-3. In one embodiment, process 700 may run in network device 110 as part of egress buffer 310-1.

Process 700 may begin when egress buffer 310-1 sends a packet from a queue or receives a packet for a queue (block 702). The queue length corresponding to the queue having sent or received the packet may be determined (block 702). If the queue length is greater than a threshold HIGH WATER MARK (block 704: YES), then the state for that queue may become CONGESTED (block 706) and process 700 may proceed to block 712. If the queue length is not greater than the threshold HIGH WATER MARK (block 704: NO), then process 700 may proceed to block 708 where it may be determined whether the queue length is less than the threshold LOW WATER MARK (block 708). If so (block 708: YES), then the state for the queue may become NOT CONGESTED (block 710) and procedure 700 may proceed to block 712. In one embodiment, the HIGH WATER MARK may be greater than the LOW WATER MARK. In one embodiment, the HIGH WATER MARK and the LOW WATER MARK can each be different for different queues. Having the two thresholds HIGH WATER MARK and LOW WATER MARK may allow for a hystorisis and may reduce the amount of signaling of the congestion state to ingress buffers 304-1, 304-2, and 304-3.

If the congestion state has changed (block 712: NO) since the previous time process 700 was performed (e.g., comparing the current state to the value stored in variable PREVIOUS STATE), then the congestion state may be sent to the modules (block 716), e.g., packet schedulers 306-1, 306-2, and 306-3, and the time of sending the congestion state may be marked (block 718).

If the congestion state has not changed (block 712: YES), then the current state is sent to all modules (block 716) when the current time minus the previously marked time ($\Delta T$) is greater than a threshold T2 (block 714: YES) and process 700 may move to block 718. If the congestion state has not changed (block 712: YES) and the current time minus the previously marked time ($\Delta T$) is not greater than the threshold T2 (block 714: NO), then process 700 may move to block 718. At block 718 the variable PREVIOUS STATE is set to value of the current state for the next time process 700 may be performed.

In one embodiment, T2 is less than T1 so that ingress buffer 304-2 may be updated with the congestion state before the current state "times out" in ingress buffer 304-2. In one embodiment, the queue length is checked only when a packet is sent or received because any congested state will expire in egress buffers 310-1 through 310-3. In another embodiment, the queue length is checked on a periodic basis.

CONCLUSION

One or ore embodiments described herein may efficiently use limited egress buffer resources in a data traffic processing system. One or more embodiments described herein may efficiently use limited processor resources in a traffic processing system. Embodiments described herein may provide for centralized egress buffers and centralized traffic shaping. One or more embodiments described herein allow for robust and fault tolerant protocol to signal congestion in a network device.

The descriptions of exemplary components above include a discussion of software instructions contained in computer-readable media. Alternatively, in each of these implementations, hardwired circuitry may be used in place of or in combination with software instructions to implement processes described herein. Thus, implementations described herein are not limited to any specific combination of hardware circuitry and software.

It will also be apparent that aspects, as described above, may be implemented in many different forms of software, firmware, and hardware in the implementations illustrated in the figures. The actual software code or specialized control hardware used to implement these aspects is not limiting of the present invention. Thus, the operation and behavior of the aspects were described without reference to the specific software code—it being understood that software or control hardware could be designed to implement the aspects based on the description herein.

Further, although the processes described above, including process 500, 600, and 700, may indicate a certain order of blocks, the blocks in these figures may be configured in any order.

In addition, implementations described herein may use the internet-protocol (IP), asynchronous transfer mode (ATM) protocol, or any other type of network protocol. As such, implementations described herein may use IP addresses, ATM addresses, or any other type of network addresses. Implementations may be described in terms of packets, implementations could use any form of data (packet or non-packet).

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving a packet in a network device;
    selecting one of a plurality of ingress buffers, where each ingress buffer is associated with a different one of a plurality of processors;
    distributing the packet to the selected ingress buffer;
    receiving, from an egress buffer associated with the packet, a congestion state of a queue in the egress buffer; and
    scheduling the packet, based on the congestion state of the queue in the egress buffer associated with the packet, to be processed by the processor associated with the selected ingress buffer to provide a network service, where scheduling the packet includes:
        scheduling the packet to be processed by the processor associated with the selected ingress buffer when the received congestion state indicates that the egress queue is not congested,
        scheduling the packet to be processed by the processor associated with the selected ingress buffer when the congestion state was received more than a threshold time earlier and the received congestion state indicates that the queue in the egress buffer is congested, and
        where scheduling the packet includes not permitting the processing of the packet if the received congestion state indicates that the queue in the egress buffer is congested and the congestion state was received not more than the threshold time earlier.

2. The method of claim 1, further comprising processing the packet by the processor associated with the selected ingress buffer to provide the network service after the packet is scheduled for processing.

3. The method of claim 2, further comprising receiving, by the egress buffer, the processed packet after processing the packet by the processor associated with the selected ingress buffer.

4. The method of claim 3, further comprising outputting, from the egress buffer, the processed packet to a destination of the processed packet, where the destination is another network device.

5. The method of claim 2, where the network service includes one of data compression, caching, molecular sequence reduction, network sequence caching, acceleration, packet flow acceleration, application flow acceleration, application control, quality of service (QoS) control, policy-based multipath control, or deterministic finite automaton (DFA) pattern matching.

6. The method of claim 1, where selecting the ingress buffer includes classifying the packet based on one or more of a source address, a destination address, a source port, a destination port, a protocol, or an application associated with the packet.

7. The method of claim 6, where classifying the packet includes determining whether the packet belongs to a class, a flow, or a session; and where distributing the packet includes distributing the packet based on the determination.

8. The method of claim 1, further comprising:
    determining a length of the queue in the egress buffer;
    indicating the congestion state as congested when the length is greater than a high threshold; and
    indicating the congestion state as not congested when the length is less than a low threshold.

9. The method of claim 8, where the high threshold differs from the low threshold.

10. The method of claim 8, further comprising sending the congestion state of the queue in the egress buffer when the state changes or periodically when the state does not change.

11. The method of claim 1, where scheduling the packet further includes:
    holding the packet in the selected ingress buffer without scheduling the packet for processing when the congestion state was received not more than the threshold time earlier and the received congestion state indicates that the queue in the egress buffer is congested.

12. A network device comprising:
    a receiver to receive a packet;
    a plurality of memories, each of the plurality of memories storing a different ingress buffer and at least one of the plurality of memories storing an egress buffer, associated with a plurality of the different ingress buffers, the egress buffer including a queue associated with the packet; and a plurality of processors, each associated with a different ingress buffer, where one of the plurality of processors selects one of a plurality of ingress buffers and distributes the packet to the selected ingress buffer, where the processor associated with the selected ingress buffer schedules the packet, based on a congestion state of the queue associated with the packet, to be processed by the processor associated with the selected ingress buffer to provide a network service, where the processor associated with the selected ingress buffer receives the congestion state from the egress buffer, schedules the packet for processing when the congestion state is not congested, and schedules the packet to be processed by the processor associated with the selected ingress buffer when the congestion state was received more than a threshold time earlier and the congestion state is congested, and where the processor associated with the selected ingress buffer does not process the packet to provide the network service when the congestion state is congested and the congestion state was received not more than the threshold time earlier.

13. The network device of claim 12, where the processor associated with the selected ingress buffer processes the packet, after receiving the packet, to provide the network service.

14. The network device of claim 13, where the network service includes one of data compression, caching, molecular sequence reduction, network sequence caching, acceleration, packet flow acceleration, application flow acceleration, application control, quality of service (QoS) control, policy-based multipath control, or deterministic finite automaton (DFA) pattern matching.

15. The network device of claim 12, where the processor that selects one of the plurality of ingress buffers classifies the packet based on one or more of a source address, a destination address, a source port, a destination port, a protocol, or an application associated with the packet, and distributes the packet based on a classification of the packet.

16. The network device of claim 15, where the processor associated with the selected ingress buffer determines whether the packet belongs to a class, a flow, or a session; and where distributing the packet includes distributing the packet based on the class, the flow, or the session.

17. The network device of claim 12, where the egress buffer is associated with one of the plurality of processors, and where the processor associated with the egress buffer determines the length of the queue in the egress buffer and indicates the congestion state as congested when the length is greater than a high threshold and indicates the congestion state as not congested when the length is less than a low threshold.

18. The network device of claim 17, where the processor associated with the egress buffer sends the congestion state of the queue to the processor associated with the packet when the state changes or periodically when the state does not change.

19. A non-transitory computer readable medium having instructions stored thereon, the instructions comprising:

instructions to receive a packet in a network device;

instructions to select one of a plurality of ingress buffers, where each ingress buffer is associated with a different one of a plurality of processors;

instructions to distribute the packet to the selected ingress buffer; and instructions to schedule the packet, based on a congestion state of a queue in an egress buffer associated with the packet, to be processed by the processor associated with the selected ingress buffer to provide a network service, where the instructions to schedule the packet include:

instructions to schedule the packet to be processed by the processor associated with the selected ingress buffer when the received congestion state indicates that the egress queue is not congested, instructions to schedule the packet to be processed by the processor associated with the selected ingress buffer when the congestion state was received more than a threshold time earlier and the received congestion state indicates that the queue in the egress buffer is congested, and instructions to schedule the packet to not be processed by the processor associated with the selected ingress buffer when the congestion state is congested and the congestion state was received not more than the threshold time earlier.

20. The non-transitory computer-readable medium of claim 19, where the instructions further comprise instructions to process the packet by the processor associated with the selected ingress buffer to provide the network service.

* * * * *